United States Patent [19]

Carrow

[11] Patent Number: 4,504,086
[45] Date of Patent: Mar. 12, 1985

[54] PIPE TEE
[75] Inventor: Guy E. Carrow, Bartlesville, Okla.
[73] Assignee: Phillips Petroleum Company, Bartlesville, Okla.
[21] Appl. No.: 456,892
[22] Filed: Jan. 10, 1983
[51] Int. Cl.³ .................. F16L 41/00; F16L 47/00
[52] U.S. Cl. ........................... 285/156; 285/423; 285/DIG. 20; 156/172; 156/187
[58] Field of Search ............. 285/156, 423, DIG. 16, 285/DIG. 20; 156/172, 185, 187, 173, 175, 184, 215, 213, 212

[56] References Cited

U.S. PATENT DOCUMENTS

| 3,124,001 | 3/1964 | Conley | 73/322.5 |
|---|---|---|---|
| 3,202,560 | 8/1965 | Michael | 156/162 |
| 3,665,968 | 5/1972 | De Putter | 138/141 |
| 3,691,000 | 9/1972 | Kalnin | 161/60 |
| 3,765,979 | 10/1973 | Thomas | 285/156 X |
| 3,773,583 | 11/1973 | Quirk | 156/172 X |
| 4,123,307 | 10/1978 | Lemelson | 156/172 |
| 4,167,453 | 9/1979 | Knappstein et al. | 202/141 |

FOREIGN PATENT DOCUMENTS 2083880  3/1982  United Kingdom .............. 285/156

Primary Examiner—Richard J. Scanlan, Jr.

[57] ABSTRACT

A pipe tee comprises a substrate having deposited thereon a reinforcing wrapping of a resin-impregnated filament.

13 Claims, 15 Drawing Figures

PIPE TEE

BACKGROUND OF THE INVENTION

In one aspect, the invention relates to a pipe tee. In another aspect, the invention relates to improvements to a pipe tee. In yet another aspect, the invention relates to a process for forming a plastic pipe tee.

Plastic pipe has come into extensive use in recent years for handling corrosive materials, petrochemicals, and the like where metallic pipe is unsuitable; and other applications where metallic pipe is unduly expensive. The plastic pipe itself, which can be formed from a suitable thermoplastic material such as polyethylene, is usually extruded from high throughput machines.

Plastic pipe fittings for such pipes up to a pipe diameter of about 8 inches are usually injected molded. Such fittings are small and have good stress ratings and can be made economically on commercially available equipment. The larger pipe fittings, such as for pipes having a diameter from about 10 inches up to about 48 inches, are too expensive to made by injection molding since they require massive equipment and extremely high mold costs. Rotationally molded fittings can be made at considerably lower cost do to the less expensive equipment requirements. However, when pipe fittings are rotationally molded, it is extremely difficult to control the wall thickness of the fitting so as to provide sufficient strength at the areas of greatest stress. It is particularly difficult to rotationally mold large diameter pipe fittings to have long term hoop stress resistance equal to the long term hoop stress resistance of the plastic pipe to which it is to be attached. Additionally the heavy walls require extremely long cycle times and do not develop good gel on the inside surfaces. Further the heavy wall is difficult to mold without bubbles, which can lead to premature failure.

It will be extremely desirable to solve these molding problems and provide long term hoop stress resistance in the fitting equal to the long term hoop stress resistance in the piping system; to mold thinner wall pipe fittings; and to reinforce pipe fittings by economical methods.

OBJECTS OF THE INVENTION

It is thus an object of this invention to provide a pipe fitting which is reinforced so as to require only small amounts of material in the walls, and to be suitable for fabrication by rotational molding.

It is another object of this invention to provide a reinforced pipe fitting which utilizes only small amounts of the reinforcing material.

It is a further object of this invention to provide a method for reinforcing of pipe fitting which is readily adapted for automation and provides economical results.

SUMMARY OF THE INVENTION

In one aspect of the present invention, there is provided a suitable suitable substrate defining a branched pipe fitting which was deposited thereon a reinforcing wrapping of resin impregnated filament rovings. The wrapping of resin impregnated filament rovings provides reinforcement to the pipe fitting and allows for the use of a thinner walled substrate. Additionally, the filament rovings can be deposited on selected pipe fittings when their end use is to be for relatively high pressure service.

In another aspect of the present invention, a plastic pipe tee is provided having a straight run with the straight run having a back side, a front side opposite from the back side, a first hand side between the back side and the front side, and a second hand side opposite to the first hand side, the first hand side bearing a branch which divides the straight run into a first end portion and a second end portion with the intersection between the branch and the straight run passing through a first apex point on the first hand side and a second apex point on the second hand side, each of the first apex point and the second apex point being a point at which a line following the exterior surface of the straight run is tangent to the intersection of the branch and the straight run, the back side of the run have a center point on its surface which is coaxial to the axis of the branch. Onto the run of this pipe tee, there is deposited one or more circuits of a wrapping characterized by a combination of six helical wraps. The first wrap extends from the front side of the first end portion across the first hand side, the center point of the back side, the second hand side and to the front side of the second end portion. The second wrap extends from the front side of the second end portion, across the first hand side, the center point of the back side, the second hand side and to the front side of the first end portion. The third wrap extends from the front side of the first end portion across the first apex point on the first hand side and to the back side of the second hand portion. The fourth wrap extends from the back side of the second end portion, across the second apex point on the second hand side, and to the front side of the first end portion. The fifth wrap extends from the back side of the first end portion, across the second apex point of the second hand side, and to the front side of the second end portion. The sixth wrap extends from the front side of the second end portion, across the apex point of the first hand side, and to the back side of the first end portion. Where the wrapping has a relatively narrow width relative to the width of the branch, reinforcement will require minimal amounts of material while adequate reinforcement will be provided to the areas of the pipe most prone to pressure induced failure. This reinforced pipe tee can be produced by continuously winding one or more circuits of the wrapping following a path beginning on the front side of the first end portion and extending from the front side of the first end portion angularly across the first hand side, the center point of the back side, the second hand side, angularly crossing to the front side of the second end portion and circumferentially around the second end portion at least once, then continuing along a second wrap extending from the front side of the second end portion, angularly across the first hand side, the center point of the back side, the second hand side and angularly crossing to the front side of the first end portion and circumferentially around the first end portion at least once; then continuing along a third wrap extending from the front side of the first end portion angularly across the apex point of the first hand side to the back side of the second end portion and around the second end portion at least once; then continuing along a fourth wrap extending from the back side of the second end portion angularly across the apex point of the second hand side, to the front side of the first end portion and circumferentially around the first end portion at least once; then continuing along a fifth wrap extending from the back side of the first end portion, across the apex point of the second hand side, to the front side of the second end portion and circumferentially around the second end portion at least once; then continuing along a sixth wrap extending from the front side of the second end portion angularly across the apex point of the first hand side to the back side of the first end portion. The method is readily automated since the wrapping can be formed from continuous filament rovings and thus can be utilized to provide extremely economical results.

DETAILED DESCRIPTION OF THE INVENTION

Figure 12:
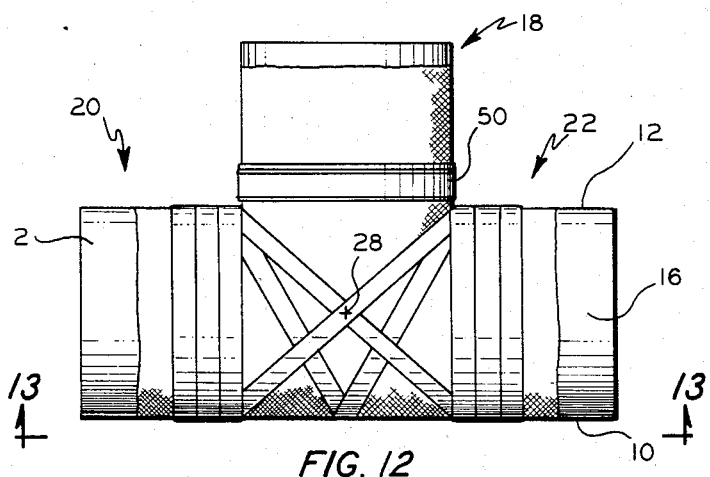
FIG. 12 is an elevational view of a pipe tee according to one embodiment of the present invention.
Figure 13:
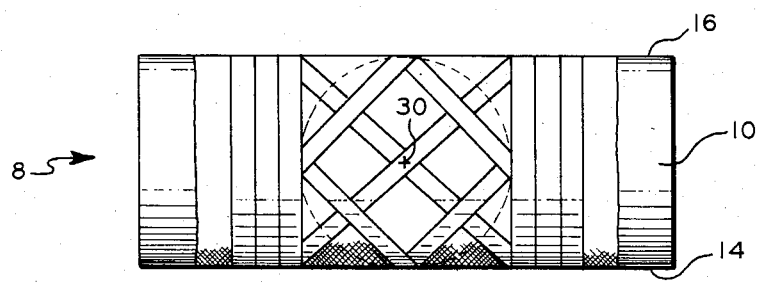
FIG. 13 is a bottom view of the embodiment shown in FIG. 12 when viewed along the indicated lines 13—13.

Referring to FIGS. 12 and 13, the preferred embodiment of the invention is broadly a branched pipe fitting 2, the wall of which is formed from a suitable substrate encased in one or more layers of resin impreganted fabric, hereinafter described and having deposited thereon a reinforcing wrapping 4 of a resin impregnated filament roving 6. The fitting 2 can be formed from any suitable substrate. Preferably, the branched pipe fitting 2 is formed from a thermoplastic material, such as cross-linkable polyethylene. More preferably, the branched pipe fitting 2 is in the form of a pipe tee where the branch intersects the run at an angle of about 90° because pipe tees have been tested with good results. Other branched pipe fittings, such as Y-shaped fittings, can also be strengthened according to the invention. Generally the pipe tee will be formed by a rotational molding process because rotational molding is the most economical way to form pipe tees having a large diameter such as in the range from about 10 inches to about 48 inches.

The reinforcing wrapping of filament preferably contains fiberglass rovings. A suitable filament roving is PPG Glass Roving No. 1062T250. This glass roving has a weight of about 247 yards per pound and contains four rovings. The resin with which the filament is impregnated is generally selected from resins which use a curing agent, such as epoxy resins, polyester resins, or polyurethane resins. Epoxy resin is preferred, such as Shell Epon 828, which has been used with good results. This resin can be cured with Apco 2170 amine-type hardner and optionally oven cured at an elevated temperature such as about 300° F. for a few hours to complete curing.

Figure 1:
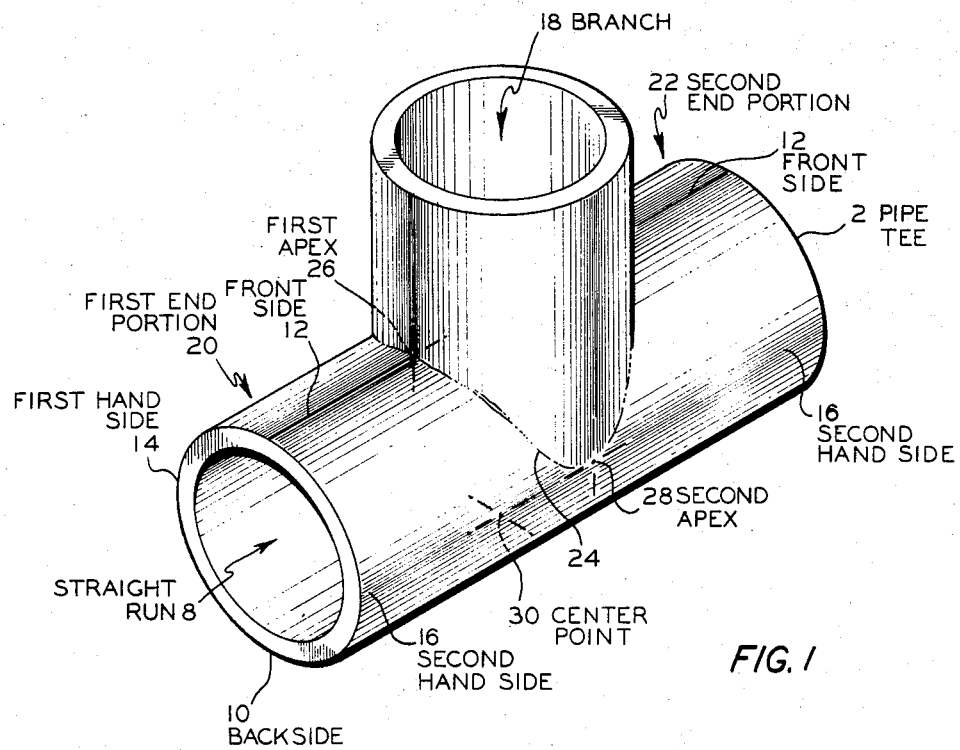
FIGS. 1 and 2 are pictorial representations of an unwrapped tee labeled with the nomenclature used in the application.
Figure 2:
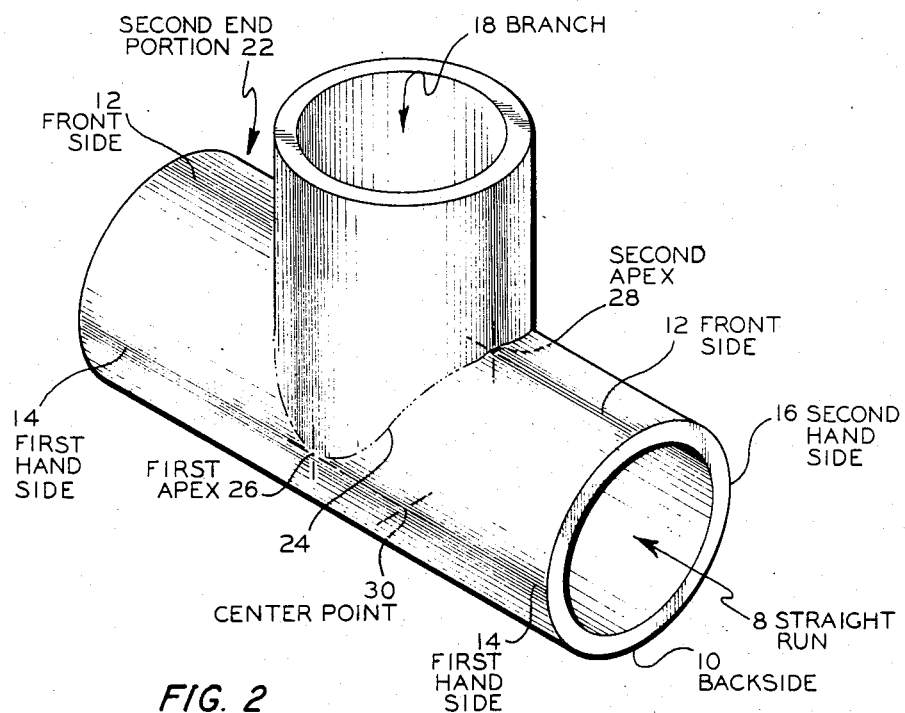

FIGS. 1 and 2 illustrate a branched pipe fitting in the form of a pipe tee 2 which is preferably formed from a plastic substrate. The pipe tee 2 has a straight run 8, and a branch 18 which intersects the run at an angle of about 90° and divides the straight run into a first end portion 20 and a second end portion 22. Each end portion has a back side 10, a front side 12 opposite from the back side 10, a first hand side 14 between the back side 10 and the front side 12 and a second hand side 16 opposite to the first hand side 14.

As between FIGS. 1 and 2, the pipe tee has been rotated about the axis of branch 18 by an angle of about 90° in the counterclockwise direction. In FIG. 1, second hand side 16 of straight run 8 is illustrated, while in FIG. 2, first hand side 14 of straight run 8 is illustrated. This relationship is repeated as between FIGS. 3 and 4, FIGS. 5 and 6, FIGS. 7 and 8, and FIGS. 14 and 15.

The branch 18 and the run 8 intersect at a saddle shaped intersection 24. The intersection 24 passes through a first apex point 26 on the first hand side 14 of the straight run 8 and a second apex point 28 on the second hand side 16 of the straight run 8. The apex point on each of the first side 14 and the second side 16 is the point at which a line following the surface of the straight run 8 is tangent to the intersection 24 of the branch 18 and the straight run 8. The back side 10 of the straight run 8 has a center point 30 which is opposite to the branch 18. This is most clearly shown in FIG. 13.

In accordance with one embodiment of the invention, the plastic pipe tee 2 has deposited on it one or more circuits of a wrapping 4 comprising a combination of six helical wraps extending between the first end portion 20 and the second end portion 22.

Figure 3:
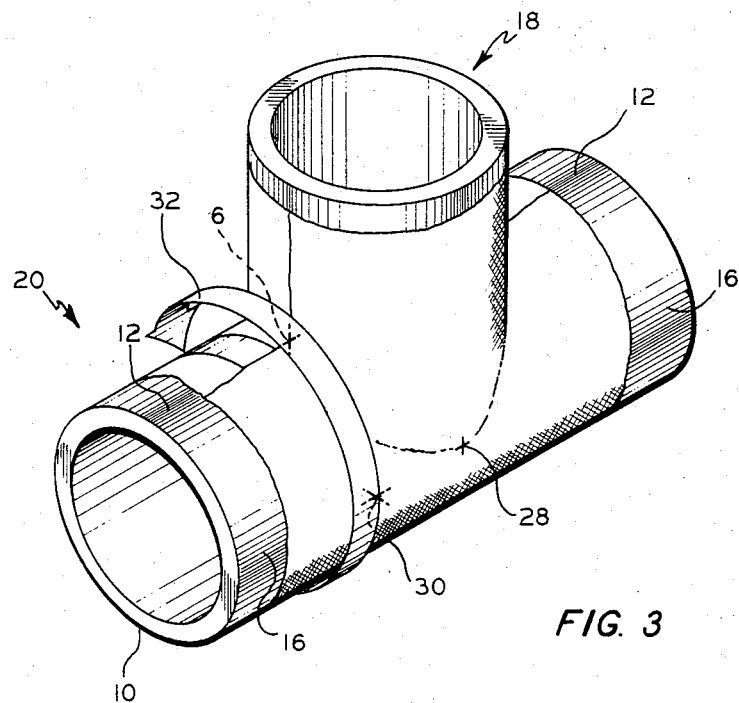
FIGS. 3-11 illustrate sequentially the wrapping steps utilized in accordance with the preferred embodiment of the present invention.
Figure 4:
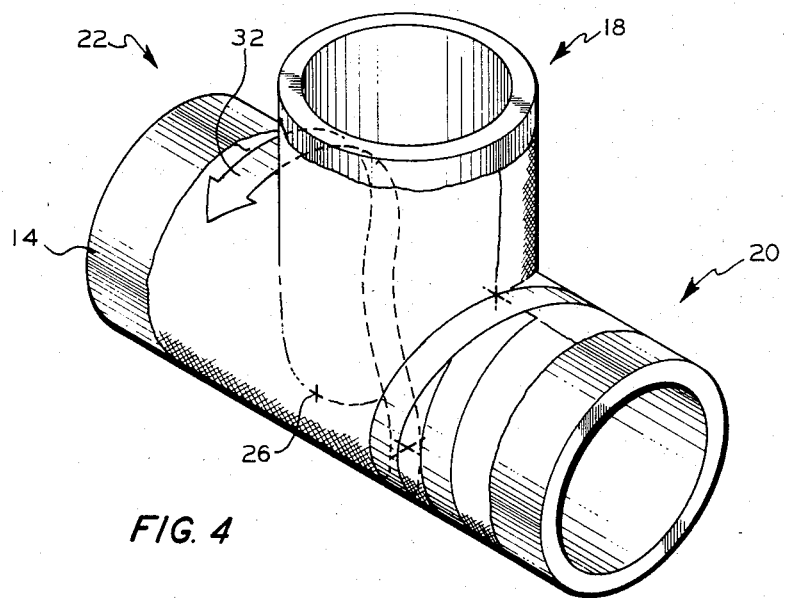

As shown best in FIGS. 3 and 4, the first wrap 32 extends from the front side 12 of the first end portion 20 across the first hand side 14, the center point 30 of the back side 10, the second hand side 16 and to the front side 20 of the second end portion 22. If desired, the wrapping 4 can then extend around the second end portion 22 at least once circumferentially.

Figure 5:
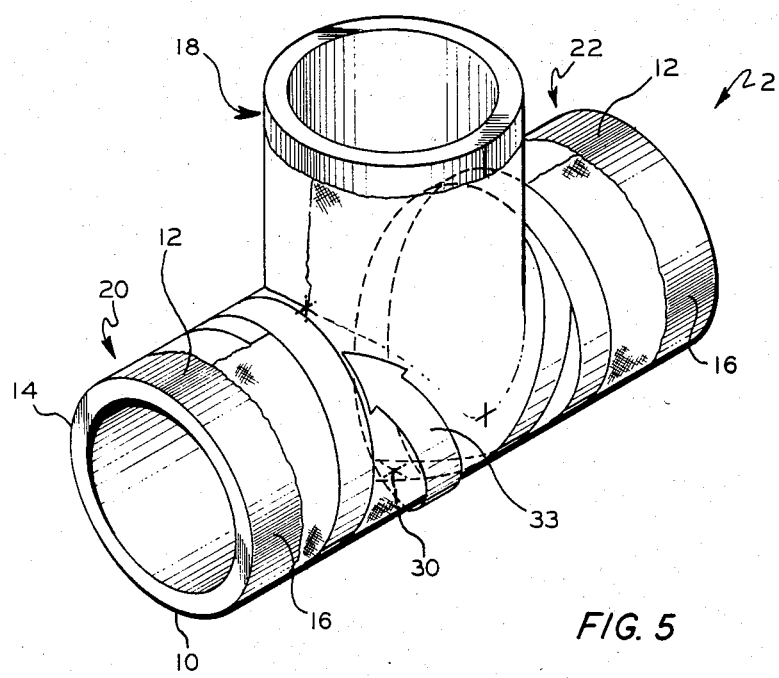

As shown best in FIG. 5, a second wrap 33 extends from the front side 12 of the second end portion 22, across the first hand side 14, the center point 30 of the back side 10, the second hand side 16 and to the front side 12 of the first end portion 20. If desired, the wrapping can then extend circumferentially around the first end portion 20 at least once.

Figure 6:
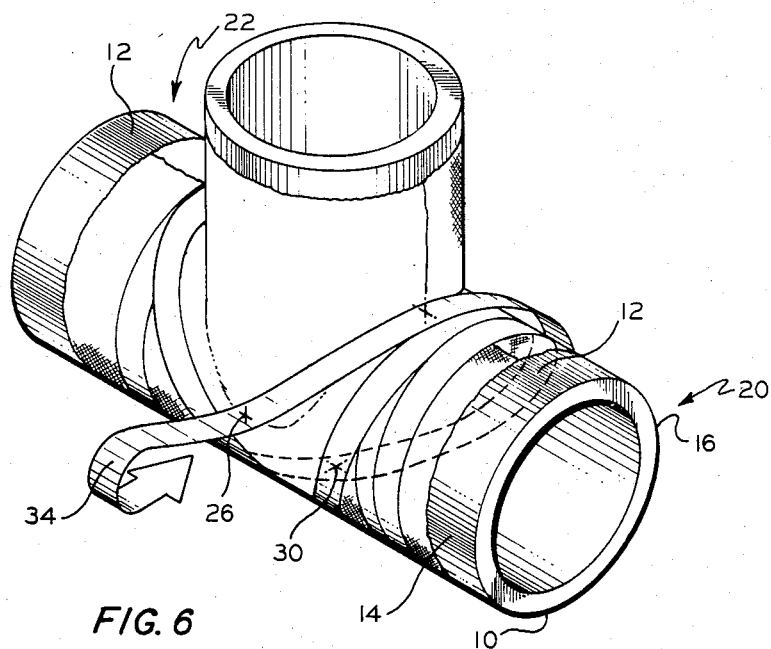
Figure 7:
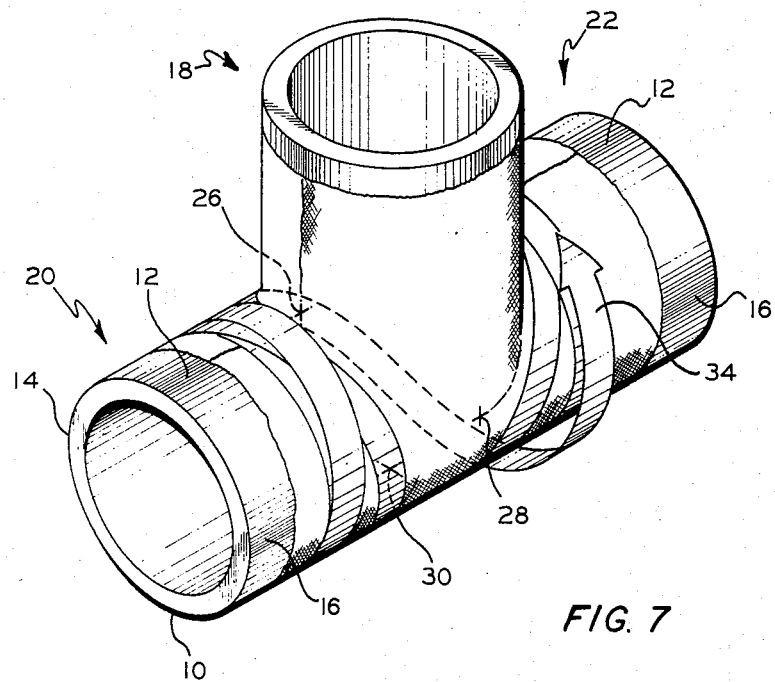
Figure 8:
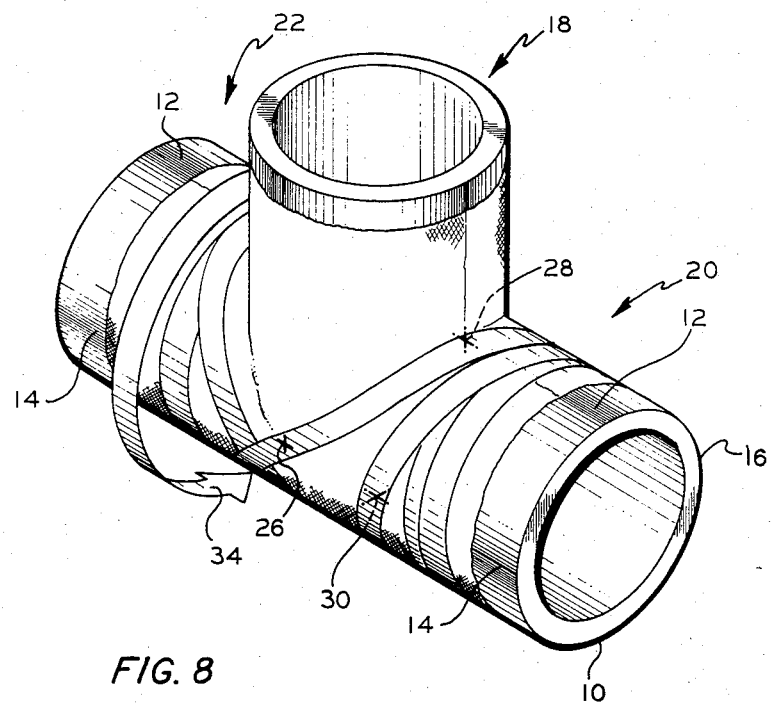

In FIGS. 6 and 7, a third wrap 34 extends from the front side 12 of the first end portion 20, across the first apex point 26 on the first hand side 14, and to the back side 10 of the second end portion 22 as best shown in FIG. 7. If desired, the wrapping can then extend at least once circumferentially around the second end portion 22 as illustrated in FIG. 8 for example.

Figure 9:
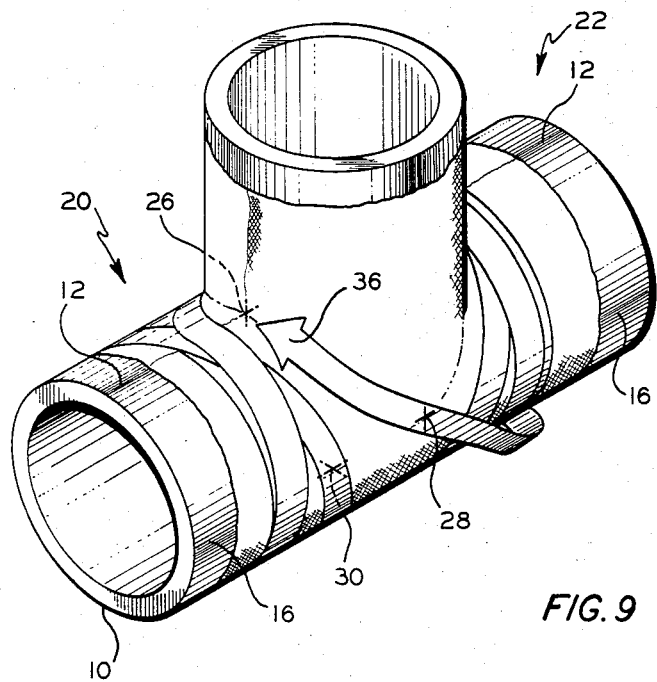

Referring to FIG. 9, a fourth wrap 36 extends from the back side 10 of the second end portion 22, across the second apex point 28 on the second hand side 16, and to the front side 12 of the first end portion 20. The wrapping can then, if desired, extend at least once circumferentially around the first end portion 20 and preferably extends around the first end portion 20 one and one-half times.

Figure 10:
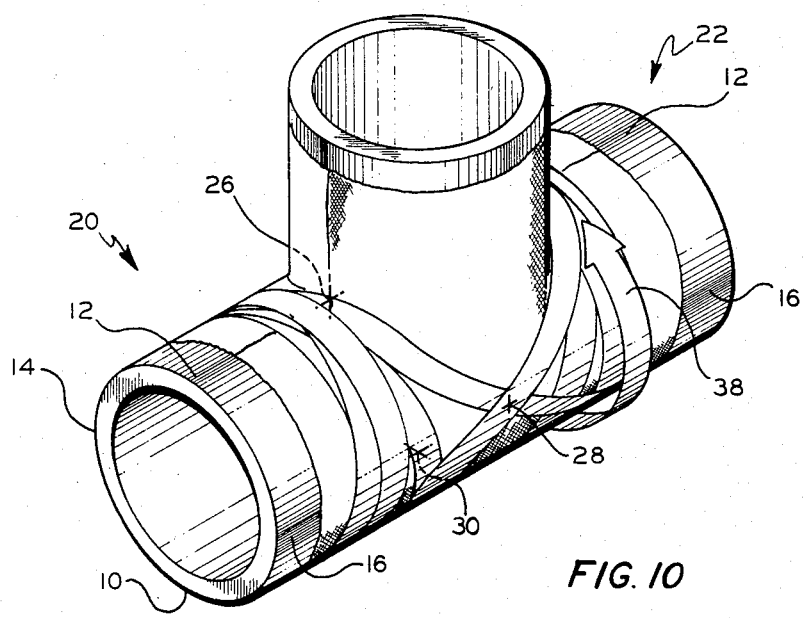

Referring to FIG. 10, a fifth wrap 38 extends from the back side 10 of the first end portion 20, across the second apex point 28 of the second hand side 16, and to the front side 12 of the second end portion 22. The wrapping can then extend at least once circumferentially around the second end portion 22.

Figure 11:
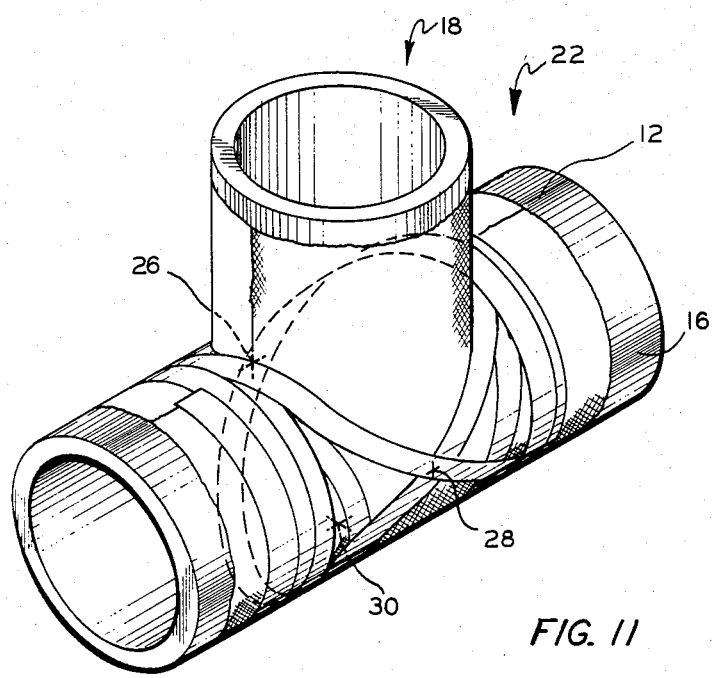

Referring to FIG. 11, a sixth wrap 40 extends from the front side 12 of the second end portion 22, across the first apex point 26 of the first hand side 14 and to the back side 10 of the first end portion 20. The wrapping can then extend partially or fully around the first end portion 20.

Figure 15:
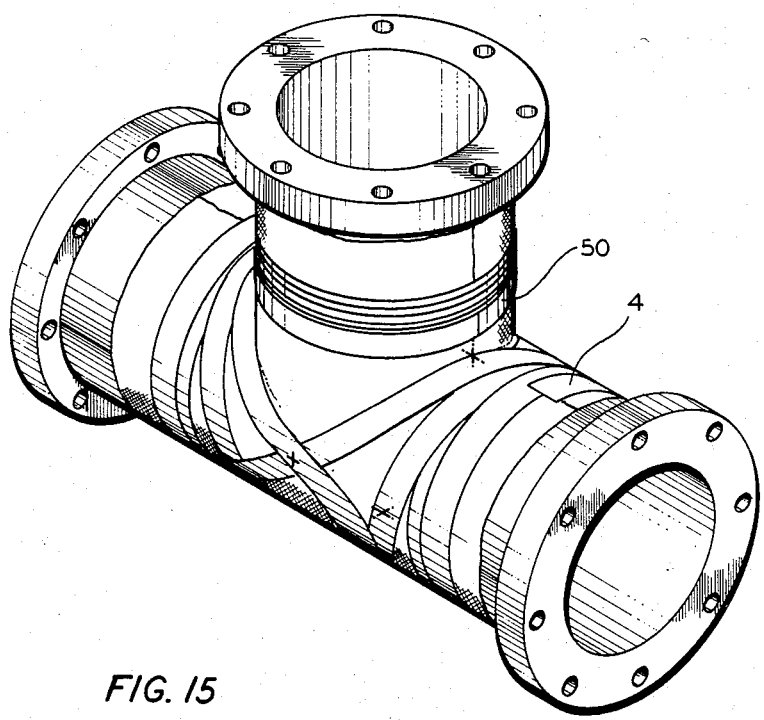
FIG. 15 is a pictorial view of the flanged tee of FIG. 14 with a plurality of circuits of wraps according to the invention and a plurality of circular wraps around the branch.

Referring to FIGS. 12 and 15, a circular wrap 50 comprising six circuits extends around the branch 18 of the tee. Preferably the wrap 50 is comprised of the same material as wrap 4. End portions 20 and 22 can be provided with a similar circular wrap if desired.

Figure 14:
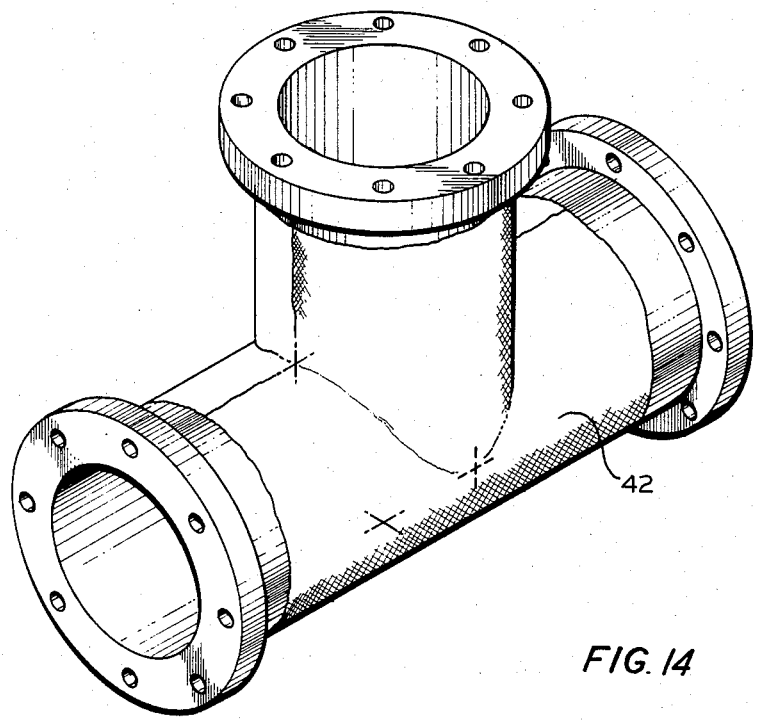
FIG. 14 is a pictorial view of a flanged pipe tee encased with resin impregnated fabric.

Preferably, as best shown by FIG. 14, for example, the plastic pipe tee 2 further comprises one or more layers 42 of resin-impregnated fabric 42 encasing the portion of the branch 18 adjacent the run 8 and the portions of the first end portion 20 of the run 8 and the second end portion 22 of the run 8 which are adjacent to the branch 18. Any desired number of layers of fabric 42 can be utilized. The resin-impregnated fabric will generally comprise about 30–50 wt.% fabric and about 50–70 wt.% resin. Preferably, where the pipe has a diameter in the range of from about 10 to about 48 inches, from about 1 to about 10 layers of fabric such as woven glass cloth will be used, usually from about 2 to about 6 layers of resin impregnated fiberglass fabric. A suitable fiberglass cloth is J. P. Stevens No. 7520, 8.70 oz./yds.$^2$, which is a 0.012 inches thick plain weave, 180 mesh plain weave glass cloth. Preferably the glass cloth is wrapped on the tee 2 so that the warp and weft yarns of the glass fabric will be substantially followed by the rovings in the third wrap, the fourth wrap, the fifth wrap, and the sixth wrap. For an 8 inch inside diameter flanged pipe tee formed of crosslinkable polyethylene having a diameter to wall thickness ratio of 15.5:1 and designed for 210 psig service, three layers of resin impregnated fiberglass cloth were used with good results. For an 8 inch flanged pipe tee formed from crosslinkable polyethylene with a diameter to side ratio of 11:1 designed for 320 psig service, five layers of the resin impregnated fiberglass cloth were with good results. The resin impregnated fiberglass cloth so used contained about 40% by weight glass and about 60% by weight polyester resin. The polyester resin tested with good results was formed from Shell Epon 828 about 76% by weight, TETA (triethylene tetraamine) approximately 7% by weight, and Apco 2170, which is a cyanoethyl modified aliphatic amine, about 17% by weight. Apco 2170 is commercially available from Applied Plastics Company of El Segundo, Calif.

Preferably, the wrapping comprises from about 1 to about 25 circuits of resin impregnated filament rovings. Each circuit is preferably formed from filament rovings because filament rovings are readily adapted for machine lay up. The wrapping preferably follows a path beginning on the front side 4 of the first end portion 20 and extending around the first end portion 20 at least once circumferentially then along the first wrap aforementioned from the front side 10 of the first end portion 20 angularly across the first hand side 14 and the center point 30 of the back side 10 to the front side 12 of the second end portion 22. The wrapping then preferably extends circumferentially around the second end portion 22 at least once. From the front side 12 of the second end portion 22, the wrapping then continues along the second wrap angularly across the first hand side 14 and center point 30 of the back side 10 to the front side 12 of the first end portion 20. The wrapping then extends preferably circumferentially around the first end portion 20 at least once. The path then continues along the third wrap from the front side 12 of the first end portion 20 angularly across the first apex point 26 of the first hand side 14 and to the back side 10 of the second end portion 22. Preferably, the wrapping then extends circumferentially at least once around the second end portion 22 then continues along the fourth wrap from the back side 10 of the second end portion 22 angularly across the second apex point 28 of the second hand side 16 and to the front side 12 of the first end portion 20. The wrapping then extends preferably circumferentially around the first end portion 20 at least once and then continues along the fifth wrap from the back side 10 of the first end portion 20 across the second apex point 28 of the second hand side 16 to the first side 10 of the second end portion 22 and then preferably circumferentially around the second end portion 22 at least once. The path then continues along the sixth wrap from the front side 12 of the second end portion 22 angularly across the first apex point 26 of the first hand side 14 to the back side 10 of the first end portion 20 and then ending at a point partially or fully around the first end portion 20.

More preferably from about 5 to about 20 circuits of the filament are utilized in forming the wrapping or girdle. The filament will generally comprise a plurality of substantially parallel fiberglass rovings and have a width in the range from about 5% to about 25% of the diameter of the branch 18 of the tee 2. Fiberglass tape can be used if desired. Sufficient resin, preferably of the aforementioned type, is utilized in conjunction with the fiberglass filament rovings to provide the resin impregnated filament rovings in the range of from about 60 to about 70% by weight glass and from about 40 to about 30% by weight resin. Shell Epon 828 resin has been used with good results. In a preferred embodiment, the wrapping or girdle comprises about 5 to 20 circuits of a filament having four rovings and about a ½ inch band width when deposited on the tee. A filament roving which has been used with good results is 1062T15 filament available from Pittsburgh Paint and Glass and has a weight of about 247 yards per pound.

In a preferred embodiment, the pipe tee 2 further comprises a plurality of circumferentially extending circular resin impregnated filament wraps on the branch 18, the first end portion 20, and the second end portion 22. These wraps provide the tee 2 with additional resistance to hoop stress and aesthetically improve its appearance. The filament rovings can be the same as utilized for the girdle.

Preferably, the pipe tee having the winding deposited thereon is heated to a temperature in the range from about 250° to about 350° F. for a period of time of from about 1 to about 24 hours or more to accelerate the cure of the resin. The invention is illustrated by the following example:

EXAMPLE

Flanged pipe tees of 8" nominal diameter were made by rotational molding, a method known in the art, from Marlex CL-100 L618 which is a crosslinkable ethylene-hexene copolymer furnished by Phillips Chemical Co. of Bartlesville, Okla. The samples had a 0.75" sidewall thickness. Ten of the samples were wrapped as described in the specification with five layers of woven glass cloth, J. P. Stevens #7520, 8.70 oz/yd$^2$, 0.12" thickness, plain weave and fifteen circuits of Pittsburgh Paint and Glass Co. #1062T15, 15 strand, 247 yield (yds/lb) fiberglass type saturated with resin comprised by weight of 76% Shell Epon 828, 7% trethylene tetra amine, and 17% Apco 2170 (cyanoethyl modified aliphatic amine), sold by Applied Plastics Co. of Segundo, Calif. Fifteen samples were not wrapped. All samples had steel blind flanges attached on the three openings and were hydrostatic tested at the pressures shown in the table. The samples were maintained at room temperature of about 73° F. at the indicated pressure until failure or termination of the test.

| Wrapped Tees | | |
|---|---|---|
| Sample # | Gauge Pressure PSI | Hours on Test[1] |
| 1 | 360 | 144*[2] |
| 2 | 360 | 26,000+ |
| 3 | 320 | 26,000+ |
| 4 | 320 | 26,000+ |
| 5 | 280 | 26,000+ |
| 6 | 280 | 26,000+ |
| 7 | 250 | 13,000+ |
| 8 | 250 | 13,000+ |
| 9 | 200 | 13,000+ |
| 10 | 200 | 13,000+ |

[1]Test terminated without failure.
*[2]This sample was not molded properly. It failed @ 144 hours.

| Non-Wrapped Tees | | |
|---|---|---|
| | | Hours to Failure |
| 11 | 360 | 14 |
| 12 | 360 | 192 |
| 12 | 360 | 96 |
| 14 | 330 | 7 |
| 15 | 330 | 528 |
| 16 | 320 | 168 |
| 17 | 320 | 1560 |
| 18 | 300 | 408 |
| 19 | 300 | 384 |
| 20 | 300 | 672 |
| 21 | 280 | 908 |
| 22 | 280 | 672 |
| 23 | 280 | 1532 |
| 24 | 260 | 1152 |
| 25 | 260 | 2184 |
| 26 | 250 | 888 |
| 27 | 250 | 1008 |
| 28 | 250 | 3096 |
| 29 | 230 | 1416 |
| 30 | 230 | 960 |
| 31 | 230 | 1152 |
| 32 | 200 | 3144 |
| 33 | 200 | 2616 |
| 34 | 200 | 5208 |
| 35 | 150 | 4056 |
| 36 | 150 | 5928 |

It can be seen from the preceding Table that the wrapping provided a considerable improvement in long term hoop stress.

What is claimed is:

1. A plastic pipe tee having a straight run, the straight run having a back side, a front side opposite from the back side, a first hand side between the back side and the front side, and a second hand side opposite to the first hand side, wherein the front side bears a branch which divides the straight run into a first end portion and a second end portion and the intersection between the branch and the straight run passes through a first apex point on the first hand side and a second apex point on the second hand side, each of the first apex point and the second apex point being the point at which a straight line following the surface of the straight run is tangent to the intersection of the branch and the straight run, the back side having a center point which is opposite to the branch, said plastic pipe tee having deposited thereon one or more circuits of a winding comprising a combination of 6 helical wraps extending between the first end portion and the second end portion;
   wherein the first wrap extends from the front side of the first end portion across the first hand side, the center point of the back side, the second hand side and to the front side of the second end portion;
   wherein the second wrap extends from the front side of the second end portion, across the first hand side, the center point of the back side, the second hand side and to the front side of the first end portion;
   wherein the third wrap extends from the front side of the first end portion across the first apex point on the first hand side and to the back side of the second end portion;
   wherein the fourth wrap extends from the back side of the second end portion, across the second apex point on the second hand side, and to the front side of the first end portion;
   wherein the fifth wrap extends from the back side of the first end portion, across the second apex point of the second hand side, to the front side of the second end portion; and
   wherein the sixth wrap extends from the front side of the second end portion, across the apex point of the first hand side, and to the back side of the first end portion.

2. A plastic pipe tee having a straight run, the straight run having a back side, a front side opposite from the back side, a first hand side between the back side and the front side, and a second hand side opposite to the first hand side, wherein the front side bears a branch which divides the straight run into a first end portion and a second end portion and the intersection between the branch and the straight run passes through a first apex point on the first hand side and a second apex point on the second hand side, each of the first apex point and the second apex point being the point at which a straight line following the surface of the straight run is tangent to the intersection of the branch and the straight run, the back side having a center point which is opposite to the branch, said plastic pipe tee having deposited thereon one or more layers of a resin-impregnated woven glass fabric having warp and weft yarns, said fabric encasing the portion of the branch adjacent the run and the portions of the first end portion and the second end portion adjacent the branch, wherein the layers comprise about 30–50% by weight glass and about 50–70% by weight resin; and
   one or more circuits of a winding comprising a combination of 6 helical wraps extending between the first end portion and the second end portion;
   wherein the first wrap extends from the front side of the first end portion across the first hand side, the center point of the back side, the second hand side and to the front side of the second end portion;
   wherein the second wrap extends from the front side of the second end portion, across the first hand side, the center point of the back side, the second hand side and to the front side of the first end portion;
   wherein the third wrap extends from the front side of the first end portion across the first apex point on the first hand side and to the back side of the second end portion;

wherein the fourth wrap extends from the back side of the second end portion, across the second apex point on the second hand side, and to the front side of the first end portion;

wherein the fifth wrap extends from the back side of the first end portion, across the second apex point of the second hand side, to the front side of the second end portion; and wherein the sixth wrap extends from the front side of the second end portion, across the apex point of the first hand side, and to the back side of the first end portion.

3. A plastic pipe tee as in claim 2 wherein the warp and weft yarns of the glass fabric substantially follow the winding along the third wrap, the fourth wrap, the fifth wrap and the sixth wrap.

4. A plastic pipe tee as in claim 3 further comprising a plurality of circumferentially extending circular resin-impregnated wraps on the branch, the first end portion and the second end portion.

5. A plastic pipe tee as in claim 4 wherein the combination of 6 helical wraps comprising a circuit of winding are formed from a continuous roving following a path beginning on the front side of the first end portion and extending around the first end portion at least once circumferentially, then continuing along a first wrap from the front side of the first end portion angularly across the first hand side and the center point of the back side to the front side of the second end portion and circumferentially around the second end portion at least once; then continuing from the front side of the second end portion along a second wrap angularly across the first hand side and center point of the back side to the front side of the first end portion and circumferentially around the first end portion at least once; then continuing along a third wrap from the front side of the first end portion angularly across the first apex point of the first hand side and to the back side of the second end portion and circumferentially around the second end portion at least once, then continuing along a fourth wrap from the back side of the second end portion angularly across the second apex point of the second hand side and to the front side of the first end portion and circumferentially around the first end portion at least one and one-half times, then continuing along a fifth wrap from the back side of the first end portion angularly across the second apex point of the second hand side to the front side of the second end portion and circumferentially around the second end portion at least once, then continuing along a sixth wrap from the front side of the second end portion angularly across the first apex point of the first hand side to the back side first end portion and circumferentially around the first end portion at least once.

6. A plastic pipe tee as in claim 5 wherein the wrapping comprises from 1 to about 25 circuits of an epoxy resin-impregnated plurality-of glass rovings comprising in a range of 60% to 70% by weight glass and 40% to 30% by weight resin.

7. A plastic pipe tee as in claim 4 wherein the wrapping is formed from a plurality of fiberglass rovings and has a width in the range of from about 5% to about 25% of the diameter of the branch, and wherein the tee has from about 1 to about 10 layers of fiberglass cloth deposited thereon.

8. A plastic pipe tee as in claim 7 formed by rotationally molding crosslinkable polyethylene, laying from about 2 to about 6 layers of resin impregnated fiberglass cloth thereon, winding from about 5 to about 20 circuits of resin-impregnated fiberglass roving thereon, and curing the resin.

9. A plastic tee as in claim 8 further comprising a wrapping on the branch formed from 1 to about 25 circuits of a circular wrap around the branch adjacent to the runs.

10. A process for wrapping a pipe tee having a straight run, the straight run having a back side, a front side opposite from the back side, a first hand side between the back side and the front side, and a second hand side opposite to the first hand side, wherein the front side bears a branch which divides the straight run into a first end portion and a second end portion the intersection between the branch and the straight run portion passing through an apex point on the first hand side and an apex point on the second hand side, each of the apex points being the point at which a straight line following the surface of the straight run is tangent to the intersection of the branch and the straight run, the back side having a center point which is opposite to the branch;

said process comprising laying one or more circuits of a winding following a path beginning on the front side of the first end portion and extending around the first end portion at least once circumferentially then continuing along a first wrap extending from the front side of the first end portion angularly across the first hand side, the center point of the back side, the second hand side, angularly crossing to the front side of the second end portion and circumferentially around the second end portion at least once, then continuing along a second wrap extending from the front side of the second end portion, angularly across the first hand side, the center point of the back side, the second hand side and angularly crossing to the front side of the first end portion and circumferentially around the first end portion at least once; then continuing along a third wrap extending from the front side of the first end portion angularly across the apex point of the first hand side to the back side of the second end portion and around the second end portion at least once; then continuing along a fourth wrap extending from the back side of the second end portion, angularly across the apex point of the second hand side, to the front side of the first end portion and circumferentially around the first end portion at least once; then continuing along a fifth wrap extending from the back side of the first end portion, across the apex point of the second hand side, to the front side of the second end portion and circumferentially around the second end portion at least once; then continuing along a sixth wrap extending from the front side of the second end portion angularly across the apex point of first hand side to the back side of the first end portion and circumferentially around the first end portion at least once.

11. A process as in claim 10 further comprising impregnating the winding with an epoxy resin.

12. A process for wrapping a pipe tee having a straight run, the straight run having a back side, a front side opposite from the back side, a first hand side between the back side and the front side, and a second hand side opposite to the first hand side, wherein the front side bears a branch which divides the straight run into a first end portion and a second end portion the intersection between the branch and the straight run portion passing through an apex point on the first hand side and an apex point on the second hand side, each of the apex points being the point at which a straight line following the surface of the straight run is tangent to the intersection of the branch and the straight run, the back side having a center point which is opposite to the branch;

said process comprising laying at least one thickness of epoxy resin impregnated reinforcing fabric onto the pipe tee with the yarns of the fabric laying at an angle to the direction of the branch and the straight run; then laying one or more circuits of a winding following a path beginning on the front side of the first end portion and extending around the first end portion at least once circumferentially then continuing along a first wrap extending from the front side of the first end portion angularly across the first hand side, the center point of the back side, the second hand side, angularly crossing to the front side of the second end portion and circumferentially around the second end portion at least once, then continuing along a second wrap extending from the front side of the second end portion, angularly across the first hand side, the center point of the back side, the second hand side and angularly crossing to the front side of the first end portion and circumferentially around the first end portion at least once; then continuing along a third wrap extending from the front side of the first end portion angularly across the apex point of the first hand side to the back side of the second end portion and around the second end portion at least once; then continuing along a fourth wrap extending from the back side of the second end portion, angularly across the apex point of the second hand side, to the front side of the first end portion and circumferentially around the first end portion at least once; then continuing along a fifth wrap extending from the back side of the first end portion, across the apex point of the second hand side, to the front side of the second end portion and circumferentially around the second end portion at least once; then continuing along a sixth wrap extending from the front side of the second end portion angularly across the apex point of first hand side to the back side of the first end portion and circumferentially around the first end portion at least once.

13. A process as in claim 12 further comprising laying one or more bands of resin-impregnated fiberglass rovings circumferentially around the branch, the first end portion, and the second end portion.

* * * * *